United States Patent
Utbult et al.

(10) Patent No.: US 11,738,739 B2
(45) Date of Patent: Aug. 29, 2023

(54) METHOD AND SYSTEM TO CONTROL TORQUE DISTRIBUTION

(71) Applicant: Volvo Car Corporation, Gothenburg (SE)

(72) Inventors: Juliette Utbult, Gothenburg (SE); Derong Yang, Gothenburg (SE); Mats Jonasson, Gothenburg (SE); Bengt Jacobson, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 127 days.

(21) Appl. No.: 17/203,151

(22) Filed: Mar. 16, 2021

(65) Prior Publication Data
US 2021/0291808 A1    Sep. 23, 2021

(30) Foreign Application Priority Data
Mar. 18, 2020   (EP) .................... 20164034

(51) Int. Cl.
*B60W 30/02*   (2012.01)
*B60W 10/08*   (2006.01)
(Continued)

(52) U.S. Cl.
CPC ............ *B60W 30/02* (2013.01); *B60W 10/08* (2013.01); *B60W 30/182* (2013.01);
(Continued)

(58) Field of Classification Search
CPC .... B60W 30/02; B60W 10/08; B60W 30/182; B60W 40/068; B60W 40/101;
(Continued)

(56) References Cited

U.S. PATENT DOCUMENTS 5,453,930 A * 9/1995 Imaseki .................. B60L 15/20
180/65.265
2008/0314658 A1* 12/2008 Atarashi ................ B60K 6/547
180/65.25

(Continued)

FOREIGN PATENT DOCUMENTS

CN         102501779 B  * 12/2013
DE     102014225447 A1 *  6/2016
(Continued)

OTHER PUBLICATIONS

JP-2009055703-A Translation (Year: 2009).*
(Continued)

*Primary Examiner* — Jeff A Burke
*Assistant Examiner* — Kyle T Johnson
(74) *Attorney, Agent, or Firm* — Amin, Turocy & Watson, LLP

(57) ABSTRACT

The disclosure relates to a method to control torque distribution among a plurality of electric machines connected to at least one front wheel and at least one rear wheel of a vehicle during operation, comprising: acquiring the total torque requested; obtaining the most energy efficient torque distribution mode by using a loss model or loss map; evaluating the actual driving situation; determining if a mode switch is allowed depending on the actual driving situation; switching the torque distribution mode, if allowed; and preventing a mode switch, if not allowed.

20 Claims, 2 Drawing Sheets

(51) Int. Cl.
  *B60W 30/182* (2020.01)
  *B60W 40/068* (2012.01)
  *B60W 40/101* (2012.01)
  *B60W 40/109* (2012.01)

(52) U.S. Cl.
  CPC ........ *B60W 40/068* (2013.01); *B60W 40/101* (2013.01); *B60W 40/109* (2013.01); *B60W 2520/125* (2013.01); *B60W 2520/26* (2013.01); *B60W 2520/28* (2013.01)

(58) Field of Classification Search
  CPC ......... B60W 40/109; B60W 2520/125; B60W 2520/26; B60W 2520/28; B60L 3/12; B60L 2240/18; B60L 2240/423; B60L 2240/465; B60L 2240/80; B60L 2260/20; B60L 2260/28; B60L 2260/44; B60L 15/2045; Y02T 10/64; Y02T 10/72
  See application file for complete search history.

(56) References Cited

U.S. PATENT DOCUMENTS

| | | | | |
|---|---|---|---|---|
| 2009/0242289 | A1* | 10/2009 | Murty | B60W 10/08 475/5 |
| 2010/0114447 | A1* | 5/2010 | Moriki | B60L 3/106 701/74 |
| 2014/0121867 | A1* | 5/2014 | Tamai | B60W 10/08 180/65.265 |
| 2015/0006000 | A1* | 1/2015 | Kawata | B60W 20/30 180/65.265 |
| 2016/0221570 | A1* | 8/2016 | Chen | B60W 30/182 |
| 2017/0174097 | A1* | 6/2017 | Gillespey | B60L 3/12 |
| 2018/0297577 | A1* | 10/2018 | Lee | B60W 10/08 |
| 2018/0297585 | A1* | 10/2018 | Lian | B60T 8/17552 |
| 2019/0047542 | A1* | 2/2019 | Siuchta | B60L 7/10 |
| 2019/0092188 | A1* | 3/2019 | Plianos | B60L 15/2009 |
| 2019/0235510 | A1* | 8/2019 | Hashimoto | B60W 30/182 |
| 2019/0378041 | A1* | 12/2019 | Dhansri | G06N 7/01 |
| 2020/0376927 | A1* | 12/2020 | Rajaie | B60H 1/00764 |
| 2021/0180687 | A1* | 6/2021 | Kook | F16H 61/0213 |
| 2022/0348184 | A1* | 11/2022 | Hiroi | B60L 15/20 |

FOREIGN PATENT DOCUMENTS

| | | | |
|---|---|---|---|
| JP | 2006223073 A | | 8/2006 |
| JP | 2009055703 A | * | 3/2009 |

OTHER PUBLICATIONS

CN-102501779-B Translation (Year: 2013).*
DE-102014225447-A1 Translation (Year: 2016).*
Extended European Search Report for European Application No. 20164034.9 dated Sep. 28, 2020, 8 pages.

* cited by examiner

METHOD AND SYSTEM TO CONTROL TORQUE DISTRIBUTION

CROSS-REFERENCE TO RELATED APPLICATIONS

This application claims priority to EP Application Serial No. EP20164034.9 filed Mar. 18, 2020 and entitled, "Method and system to control torque distribution". The entirety of the aforementioned application is hereby incorporated herein by reference.

TECHNICAL FIELD

The present disclosure relates to an energy efficient method to control torque distribution among a plurality of electric machines connected to at least one front wheel and at least one rear wheel of a vehicle. The method is a computer-implemented method. The present disclosure further relates to a system to control torque distribution.

With increased electrification, the number of electric machines or motors that are available in an electric vehicle has also increased. The present disclosure suggests an energy efficient computer-implemented method and an energy efficient system to distribute propulsive and regenerative torque among a plurality of electric machines.

BACKGROUND ART

Torque distribution among a plurality of electric machines of a vehicle has an effect on power consumption and, consequently, the vehicle's cruising range. In order to reduce power consumption and to extend the cruising range, a torque distribution mode has to be selected that goes along with the least power loss. If the total torque requested changes, a mode switch could be necessary, e.g. from a first mode with torque distribution only to front or rear wheels of the vehicle to a second mode with equal torque distribution to front and rear wheels, in order to keep the power loss as low as possible.

Optimizing torque distribution to multiple electric machines or motors of a vehicle is quite complex. Thus, so called loss maps or efficiency maps have been developed in order to facilitate mode switching.

For example, known prior art discloses an efficiency map generating apparatus, an efficiency map generating method and a program. The efficiency map generating apparatus generates an efficiency map of multiple motors connected to drive wheels of a mobile body. The apparatus includes:
- an instructed torque-detecting unit that detects an instructed torque input for the motors;
- a torque-distributing unit that distributes torque to each of the motors based on the instructed torque;
- a power consumption detecting unit that detects power consumption of the motors;
- a rotation count detecting unit that detects rotation counts of the motors; and
- an efficiency map-generating unit that generates the efficiency map based on a plurality of combinations of torque, the power consumption, and the rotation counts, where the torque-distributing unit causes any of the motors to generate regenerative torque.

The efficiency map generating method disclosed by the prior art makes use of the efficiency map generating apparatus and the program disclosed causes a computer to execute the method.

Publications dealing with torque distribution generally focus on the aspect of reducing power consumption to increase battery range, thereby neglecting other important aspects, such as driving dynamics.

SUMMARY

In general, changing torque distribution while driving has an effect on driving dynamics. Possible implications may be:
- a reduced stability of the vehicle due to e.g. slip effects
- an inconsistent behavior of the vehicle, represented e.g. by a changing vehicle's understeer gradient and/or changing pitch and heave properties
- an increased discomfort due to e.g. an increased longitudinal jerk, backlash in transmission, a torsion of the driveshaft, oscillations in the driveline etc.

Thus, known mode switching strategies implemented for optimal torque distribution regularly conflict with other requirements.

In order to solve or at least alleviate the above-mentioned conflict the method according to claim 1, the system according to claim 11 and the program according to claim 14 are disclosed. Embodiments of the present disclosure are disclosed by the depending claims. The term "torque" used hereinafter relates to propulsive torque as well as regenerative torque during braking.

The method proposed is a method to control torque distribution among a plurality of electric machines connected to front wheels and rear wheels of a vehicle during operation. The method proposed comprises the following steps:
- acquiring the total torque requested;
- obtaining the most energy efficient torque distribution mode by using a loss model or loss map;
- Evaluating the actual driving situation;
- Determining if a mode switch is allowed depending on the actual driving situation;
- Switching the torque distribution mode, if allowed; and
- Preventing a mode switch, if not allowed.

Thus, before switching the torque distribution mode, an evaluation of the actual driving situation is taking place. The evaluation can come to the result that a mode switch is either allowed or not allowed. If a mode switch is not allowed, it is actively prevented in order to comply with safety and/or comfort requirements. The proposed method creates a trade-off between lowest power losses and lowest disturbance from mode switching. The key is to know when to accept and or not accept a mode switch.

Accordingly, a mode switch is maybe not allowed if the evaluation of the actual driving situation results in the mode switch not complying with safety and/or comfort requirements, e.g. if at least one of the following conditions is met:
- a lateral acceleration of the vehicle exceeds a predefined threshold;
- a friction force between at least one wheel of the vehicle and the ground falls below a predefined threshold;
- a time passed since a previous distribution mode switch is shorter than a predefined minimum time; and/or
- an understeer gradient of the vehicle is outside normal bounds.

The lateral acceleration of the vehicle indicates if the vehicle is driving straight or in a curve. If the latter is the case, the actual driving situation is not convenient for a mode switch. Thus, a mode switch may be prevented. The same applies, if the friction force between at least one wheel and the ground indicates slippery road conditions. In both cases, safety is the main issue, whereas keeping a minimum time between two mode switches mainly serves to reduce the impact on the occupant's comfort. If the understeer gradient is outside normal bounds, e.g. due to bad tires at one axle or changing loads, safety and comfort can be an issue.

The above mentioned thresholds and/or bounds are at forehand determined such that values measured while driving can be compared with the respective values of the at forehand determined thresholds and/or bounds. If the comparison comes to the result that a threshold and/or bounds are passed or exceeded, mode switching may be prevented. In addition to the above-mentioned thresholds and/or bounds, other screening criteria may also be applied.

Mode switching leads to a different torque distribution. The method proposed may know at least three torque distribution modes, i.e. torque distribution:
- only to the electric machines connected to front wheels of the vehicle, defining a first torque distribution mode;
- only to the electric machines connected to rear wheels of the vehicle, defining a second torque distribution mod; or
- to the electric machines connected to front wheels and to rear wheels of the vehicle, defining a third torque distribution mode.

Thus, the acquired total torque requested may be distributed such that there is equal torque on front motors, rear motors or on all four motors. The torque may be distributed between two electric machines/motors connected to the front wheels (front wheel drive), between two electric machines/motors connected to the rear wheels (rear wheel drive) or equally between four electric machines/motors connected to the front and rear wheels (four-wheel drive). Thus, with regard to the torque distribution in the longitudinal direction, the torque on the left and right side is substantially equal.

When the total torque requested is rather low, the torque may be distributed to the electric machines/motors of only one axle, because this is the most energy efficient mode. As the total torque request increases and/or passes a certain limit, the mode may be switched to equal torque distribution to all of the electric machines/motors.

Each electric machine/motor connected to a wheel may be directly controllable through torque requests and/or can be disconnected from the respective wheel. Furthermore, electric machines/motors to which no torque is distributed may be decoupled. This measure servers to avoid drag losses.

It is further suggested that during propulsion the axle with the lowest normal load might be used. By distributing the propulsive torque to the axle with the lowest normal load, power consumption may be further reduced because at this axle also the friction force between the wheels and the ground is the lowest. In contrast, during braking, the axle with the highest normal load is used. By distributing the regenerative torque to the axle with the highest normal load, the highest friction force between the wheels and the ground is used to support the braking action.

The method proposed may use a loss model or loss map for obtaining the most energy efficient torque distribution mode. When generating the loss model or loss map, the main dependencies may be torque and speed. However, further losses include:
- battery losses, resistive losses in cables;
- electrical machine and inverter losses;
- tire losses due to slip effects and/or rolling resistance; and/or
- aerodynamic losses by air drag.

According to one embodiment, the loss model or loss map may comprise electrical losses as well as tire losses. From the above-mentioned losses, the electrical losses are the most significant losses. However, by considering electrical losses and tire losses, the determination of the most energy efficient torque distribution mode becomes more precise. Any of the further mentioned losses, such as battery losses, resistive losses and/or losses by air drag may be neglected.

Electrical losses depend on torque and speed. They increase with torque and speed exponentially. In other words, the losses increase at a higher rate as torque and speed increase. According to one embodiment of the method proposed, the electrical losses may be measured experimentally. Tire losses that mainly depend on wheel load, applied torque and forward velocity may be modelled.

When executing the proposed method, the loss model or loss map may be pre-generated, e.g. in form of a look-up table. The pre-generated loss model or loss map is then implemented in the vehicle. Thus, depending on the type of vehicle, the same loss model or loss map can be used for a plurality of vehicles of the same type. Thus, multiple use of a loss model or loss map that has been pre-generated is possible.

The loss model or loss map may comprise evaluation of effects of temperature and/or tire pressure on power loss. The additional data increases the informative value of the loss model or loss map. The evaluation/incorporation of additional data may take place during normal operation of the vehicle, in particular if the loss model or loss map has been pre-generated.

For each drive mode of the vehicle, e.g. eco driving or dynamic driving, corresponding loss models or loss maps may be used. Because the loss models or loss maps define the thresholds for mode switching, depending on the drive strategy, different thresholds for mode switching are used. The thresholds indicate if the actual torque distribution mode is still the most energy efficient or if the torque distribution mode should be switched in order to reduce power consumption.

According to one embodiment, at least one loss model or loss map is used that has been pre-generated by using a brute force method. "Brute force method" means that a test matrix is created containing every combination of vehicle velocity and total torque request. A full factorial test matrix may be created with different torque combinations for all the electric machines fulfilling the total torque request. The torque combination that has the least amount of power losses is then selected as the torque distribution mode for that specific vehicle velocity and total torque request. The mode may be saved in a look-up table, where the x-axis relates to the velocity and the y-axis relates to the total torque requested.

It is further suggested that acquiring the total torque requested comprises calculating the total torque requested using:

$$T_{m,req} = \frac{F_{x,req} * R_1}{n},$$

wherein "$T_{m,req}$" is the requested motor torque, "$R_1$" is the average loaded radius for all wheels and "n" is the gear ratio. The above-mentioned equation already considers the actual steering wheel angle and the accelerator or brake pedal position representing the driver input. Thus, the total output torque fulfills the longitudinal force requested by the driver.

The method proposed is not only applicable to vehicles having a driver but also to vehicles that are driving autonomously. In this case, the "driver" input is given by a machine or robot.

Further proposed is a system to control torque distribution among a plurality of electric machines connected to at least one front wheel and at least one rear wheel of a vehicle. The system comprises:
- a torque allocation module for acquiring the total torque requested and obtaining the most energy efficient torque distribution mode on basis of a loss model or loss map, and
- a vehicle motion state estimator for evaluating the actual driving situation.

The system proposed allows the execution of the further proposed method. Thus, by means of the proposed system the same advantages are achievable as with the proposed method. In particular, before switching the torque distribution mode, an evaluation of the actual driving situation can take place such that a mode switch can be prevented if the evaluation comes to the result that a mode switch in the actual driving situation could have a negative effect on safety or the occupant's comfort.

According to one embodiment of the proposed system, the torque allocation module has at least one port for receiving data from the vehicle motion state estimator and/or a sensor. The data received via the port may relate to the actual driving situation and may comprise information about:
- motor speed;
- wheel speed;
- wheel slip;
- side-slip angle;
- road friction; and/or
- lateral acceleration etc.

On basis of this data/information, the torque allocation module can evaluate the actual driving situation more precisely in order to decide whether a mode switch is allowed or not allowed.

Furthermore, the torque allocation module may have at least one port for activating at least one actuator. By activating an actuator, torque is distributed to an electric machine of the vehicle. Thus, the number of actuators may correspond to the number of electric machines that are connected to the front and rear wheels of the vehicle.

In addition, a computer-readable recording medium storing a program is proposed. The program may cause a computer to execute the method mentioned above. The computer may be integrated in the system mentioned above, e.g. in the torque allocation module of the system.

BRIEF DESCRIPTION OF DRAWINGS

These and other aspects of the present disclosure will become apparent from the embodiments described hereinafter.

DESCRIPTION OF EMBODIMENTS

Figure 1:
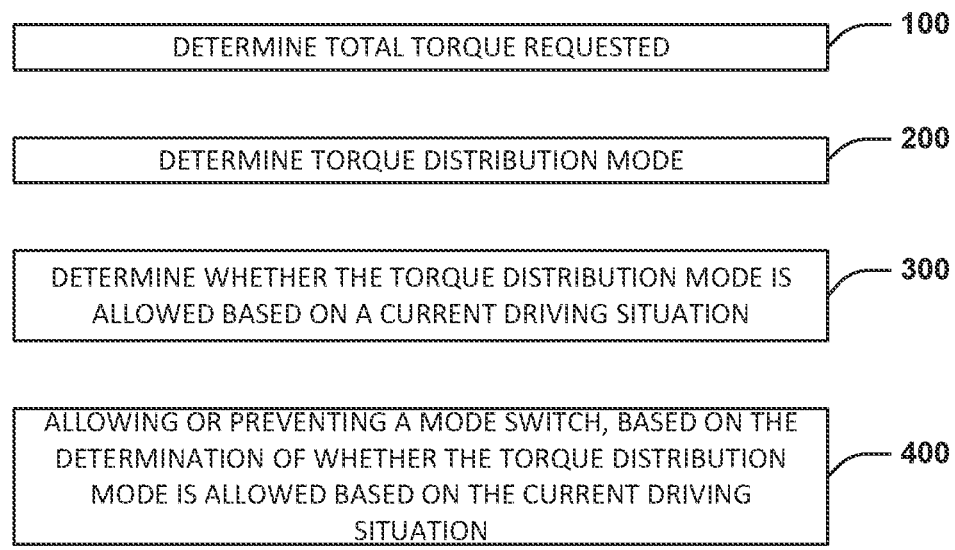
FIG. 1 shows a first block diagram in order to explain the proposed method.

FIG. 1 illustrates the main steps of the method proposed. At first, in step 100, the total torque requested by a driver or a machine is calculated. A computer or processor integrated in a torque allocation module may execute the calculation. If a driver is steering the vehicle, the torque requested by the driver may be represented by the position of an accelerator or brake pedal. In this case, before step 100 is executed, the accelerator or brake pedal position has to be translated into a longitudinal force request, e.g. by means of a driver interpreter. The driver interpreter transmits this information to the torque allocation for acquiring the total torque requested.

Figure 4:
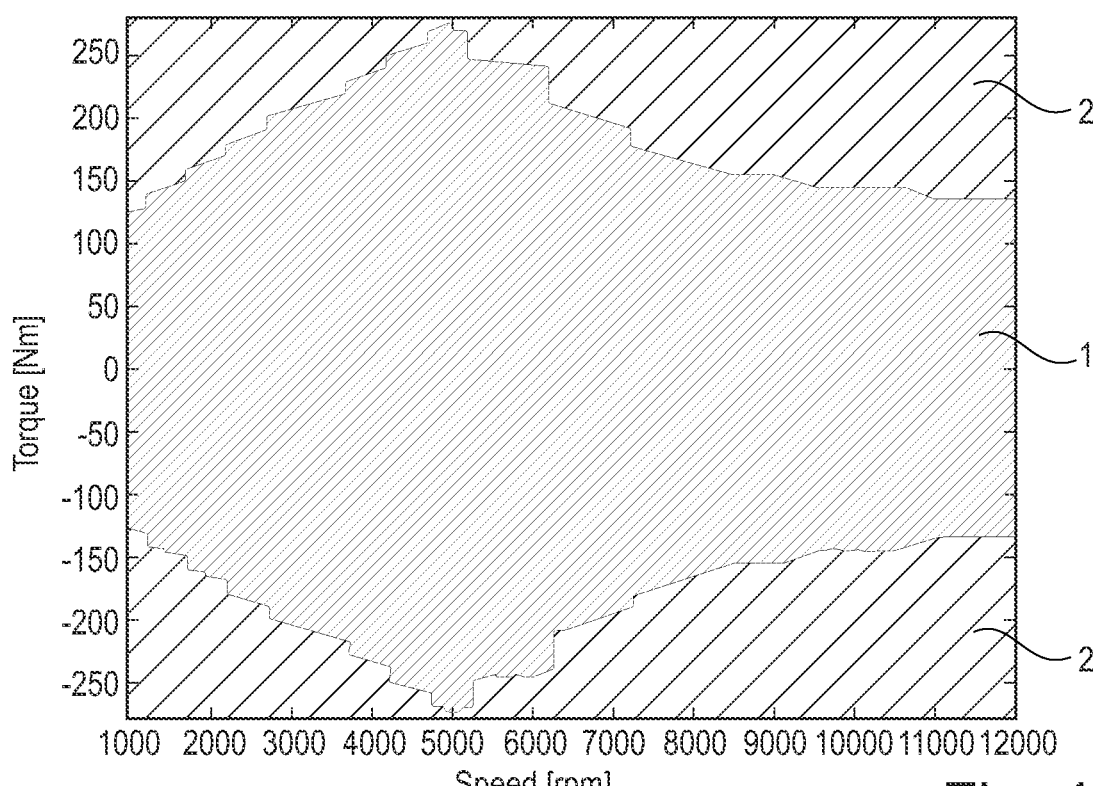
FIG. 4 shows an example of a loss map in which the x-axis represents the vehicle speed and the y-axis represents the torque requested.

In step 200, the torque allocation module may determine the most energy efficient torque distribution mode by using a loss model or loss map that has been implemented in the torque allocation module. Thus, the loss model or loss map has been pre-generated, e.g. in form of a look-up table. An example of a loss map is shown in FIG. 4 and will be explained further below. In one embodiment, a loss map is used that considers not only electrical losses (effected by the electric machines, inverters, and/or battery), but also tire losses. The consideration of tire losses improves the preciseness of the method proposed compared to methods known from the background art. Both, electrical losses and tire losses have the biggest impact on the total loss. Further losses, such as aerodynamic losses due to air drag, may be neglected.

The loss map defines thresholds suggesting a mode switch when a threshold is passed. The mode switch may take place between three different torque distribution modes, which are torque distribution
- only to front wheels,
- only to rear wheels or
- equally distributed between front and rear wheels.

Optimal torque distribution serves to reduce power consumption, which can be directly read off the loss map.

Because a mode switch has an effect on the driving dynamics, in step 300 of the method proposed, before executing a mode switch, the actual driving situation is evaluated. If this evaluation comes to the result, that a mode switch would affect the driving dynamics such that the occupant's safety or comfort is negatively influenced, the mode switch is not allowed. If the evaluation comes to the result, that safety and comfort are not negatively influenced, the mode switch is allowed.

Accordingly, in step 400 of the method proposed, after the mode switch has been allowed, the mode switch is taking place, i.e. the torque distribution to the individual electric machines of the vehicle is changed.

Figure 2:
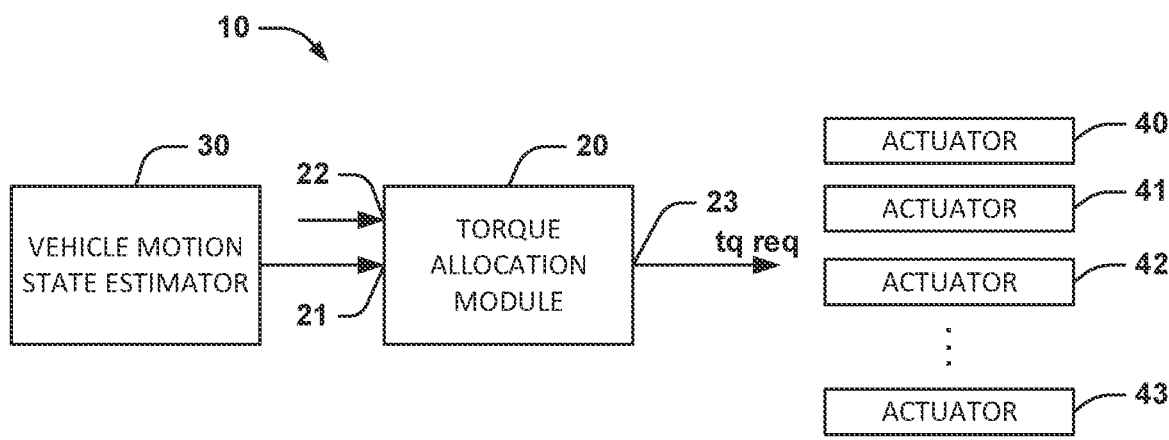
FIG. 2 shows a second block diagram in order to explain the proposed system.

FIG. 2 illustrates an embodiment of a system 10 for executing the method proposed. The system 10 comprises a vehicle motion state estimator 30 and a torque allocation module 20. The vehicle motion state estimator 3 provides the torque allocation module 20 with information, e.g. relating to side-slip angle, road friction, lateral acceleration. On basis of this information, the torque allocation module 20 evaluates the actual driving situation. The information/data is received by the torque allocation module 20 via port 21. Further information/data, e.g. relating to motor speed, wheel speed, wheel slip, may be provided by at least one sensor (not shown) and may be received by the torque allocation module 20 via port 22.

The torque allocation module 20, may execute steps 100 to 400 of the method proposed. Thus, at least one loss map is implemented in the torque allocation module 20. If the torque allocation module 20 suggests and allows a mode switch, a signal is transmitted via port 23 to at least one actuator 40, 41, 42, 43 in order to change torque distribution.

Figure 3:
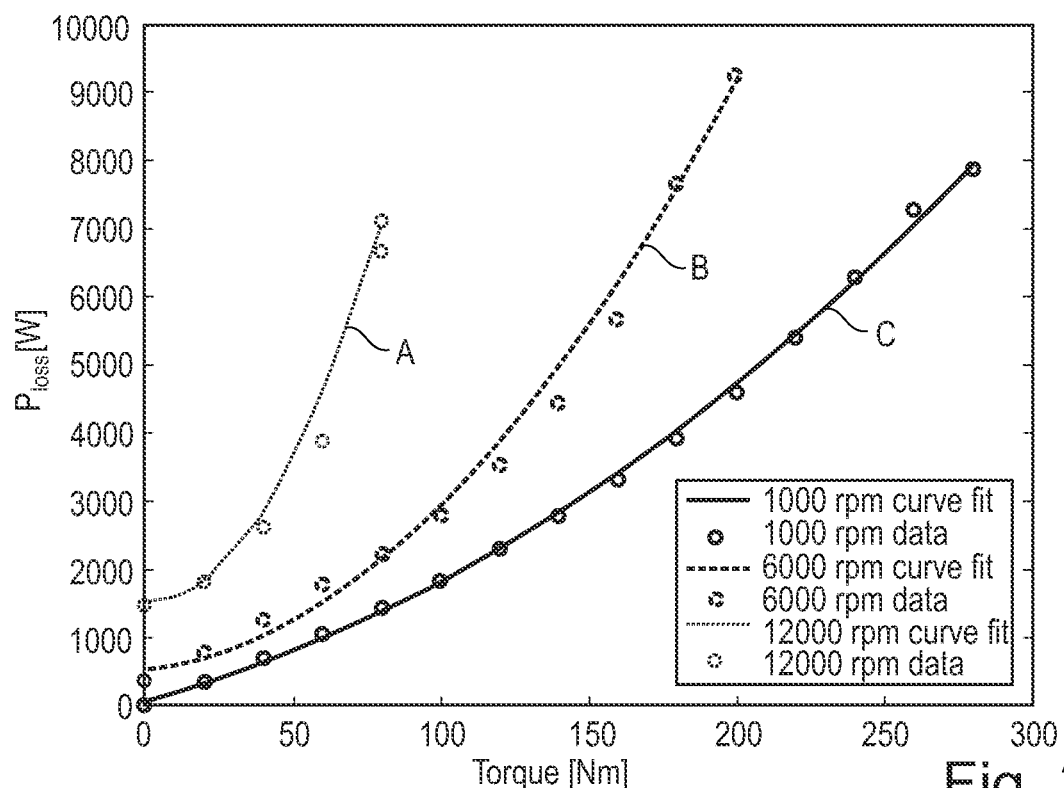
FIG. 3 shows a diagram in which the x-axis represents the torque and the y-axis represents the power loss.

FIG. 3 illustrates power losses from a typical electric machine at three different speeds (see curves A, B and C).

The power loss is mainly dependent on torque and angular speed of the electric machine. As seen from FIG. 3, when the speed increases the power loss also increases, not linear but exponentially. Assumed, that there are several electric machines available for control. Further assumed, that a request of a total propulsive torque can freely be distributed among the electric machine. Due to the non-linearity, the total loss from the electric machines is dependent on which distribution is used.

FIG. 4 illustrates a loss map for use in the method proposed. At first, desired torque distribution modes are defined. e.g. propulsive torque only at the front axle (mode 1) and equal torque distribution between front and rear axle (mode 2). When the complete loss model is known, an offline optimization can be made to determine a distribution strategy depending on angular motor speed and total propulsive torque requested. In FIG. 4, mode 1 is represented by the dark grey color, mode 2 by the light grey color.

One interpretation of FIG. 4 is, that mode 2 should only be used for high total torque request, e.g. during high acceleration and/or uphill driving. The switch torque from mode 1 to mode 2 changes with motor speed, being lower at low velocities and higher at high velocities. The speed axis (x-axis) can be interpreted as vehicle speed and the torque axis (y-axis) can be interpreted as requested longitudinal force, depending on the selected transmission ratio.

When a loss map according to FIG. 4 is implemented in the vehicle, the torque distribution can be done dependent on actual speed and requested torque. When passing through different regions on the loss map, a change from one mode to another occurs. i.e. a mode switch.

The invention claimed is:

1. A computer-implemented method to control torque distribution among a plurality of electric machines connected to wheels of a vehicle during operation, the computer-implemented method comprising:
    determining, by a system operatively coupled to a processor, a total torque requested based on a function of a longitudinal force request, an average loaded radius of the wheels, and a gear ratio;
    in response to the total torque requested:
        obtaining, by the system, a most energy efficient torque distribution mode of a group of torque distribution modes by using a loss model or loss map;
        evaluating, by the system, a current driving situation of the vehicle;
        determining, by the system, whether a mode switch from a current torque distribution mode of the group of torque distribution modes to the most energy efficient torque distribution mode is allowed based on the current driving situation;
        performing, by the system, the mode switch from the current torque distribution mode to the most energy efficient torque distribution mode, in response to a result of the determining indicating that the mode switch is allowed; and
        preventing, by the system, the mode switch from the current torque distribution mode to the most energy efficient torque distribution mode, in response to the result of the determining indicating that the mode switch is not allowed.

2. The computer-implemented method according to claim 1, wherein the mode switch from the current torque distribution mode to the most energy efficient torque distribution mode is not allowed, if the evaluation of the current driving situation with respect to the mode switch from the current torque distribution mode to the most energy efficient torque distribution mode does not comply with at least one of a safety requirement or a vehicle occupant comfort requirement based on a determination that at least one condition is met from a group of conditions comprising:
    a lateral acceleration of the vehicle exceeds a predefined lateral acceleration threshold;
    a friction force between at least one wheel of the vehicle or the ground falls below a predefined friction force threshold;
    a time passed since a previous distribution mode switch is shorter than a predefined minimum time; or
    an understeer gradient of the vehicle is outside of a normal bound.

3. The computer-implemented method of claim 2, wherein values measured while driving are compared against the conditions.

4. The computer-implemented method of claim 1, wherein the group of torque distribution modes comprise:
    a first torque distribution mode where total torque is distributed only to the electric machines connected to front wheels of the wheels of the vehicle;
    a second torque distribution mode where the total torque is distributed only to the electric machines connected to rear wheels of the wheels of the vehicle; and
    a third torque distribution mode where the total torque is distributed partially to the electric machines connected to the front wheels and partially to the electric machines connected to the rear wheels of the vehicle.

5. The computer-implemented method of claim 4, wherein each electric machine of the plurality of electric machines is connected to different wheel of the wheels, and each electric machine connected to the wheel is directly controllable through torque requests or is disconnectable from the wheel.

6. The computer-implemented method of claim 4, further comprising:
    decoupling, by the system, the electric machines to which no torque is distributed.

7. The computer-implemented method of claim 4, wherein during propulsion, torque is distributed to respective electric machines of the plurality of electric machine associated with an axle of the vehicle with the lowest normal load, and wherein during braking, torque is distributed to respective electric machines of the plurality of electric machine associated with an axle of the vehicle with the highest normal load.

8. The computer-implemented method of claim 1, wherein the loss model or loss map comprises electrical losses as well as tire losses.

9. The computer-implemented method of claim 8, wherein the electrical losses are measured experimentally and tire losses are modelled.

10. The computer-implemented method of claim 1, wherein the loss model or loss map comprises battery losses, resistive losses in cables or aerodynamic losses by air drag.

11. The computer-implemented method of claim 1, wherein the loss model or loss map is pre-generated and implemented in the vehicle.

12. The computer-implemented method of claim 1, wherein the loss model or loss map comprises evaluation of effects of temperature or tire pressure on power loss.

13. The computer-implemented method of claim 1, wherein for each drive mode of the vehicle, at least one of eco driving, dynamic driving, a corresponding loss model or loss map is used.

14. The computer-implemented method of claim 1, wherein the function comprises $$T_{m,req} = \frac{F_{x,req} * R_1}{n},$$

wherein "$T_{m,req}$" is the total torque requested, "$F_{x,req}$" is the longitudinal force request, "$R_1$" is the average loaded radius of the wheels and "n" is the gear ratio.

15. A system to control torque distribution among a plurality of electric machines connected to wheels of a vehicle, the system comprising:
- a processor; and
- a memory communicatively coupled to the processor, the memory having stored therein computer executable components, comprising:
  - a vehicle motion state estimator that evaluates a current driving situation of the vehicle; and
  - a torque allocation module that:
    - determines a total torque requested based on a function of a longitudinal force request, an average loaded radius of the wheels, and a gear ratio,
    - in response to the total torque requested:
      - obtains a most energy efficient torque distribution mode of a group of torque distribution modes based on a loss model or loss map,
      - determines whether a mode switch from a current torque distribution mode of the group of torque distribution modes to the most energy efficient torque distribution mode is allowed based on the actual driving situation,
      - perform the mode switch from the current torque distribution mode to the most energy efficient torque distribution mode, in response to a result of the determining indicating that the mode switch is allowed, and
      - prevent the mode switch from the current torque distribution mode to the most energy efficient torque distribution mode, in response to the result of the determining indicating that the mode switch is not allowed.

16. The system of claim 15, wherein the torque allocation module has at least one port that receives data from the vehicle motion state estimator or a sensor.

17. The system of claim 16, wherein the data received via the port relates to the current driving situation and comprises information about motor speed, wheel speed, wheel slip, side-slip angle, road friction, or lateral acceleration.

18. The system of claim 15, wherein the torque allocation module has at least one port that activates at least one actuator.

19. A non-transitory computer-readable medium having instructions stored thereon that, in response to execution, cause a processor to perform operations comprising:
- determining a total torque requested based on a function of a longitudinal force request, an average loaded radius of wheels of a vehicle, and a gear ratio;
- in response to the total torque requested:
  - obtaining, for a plurality of electric machines connected to the wheels of the vehicle, a most energy efficient torque distribution mode of a group of torque distribution modes by using a loss model or loss map;
  - evaluating a current driving situation of the vehicle;
  - determining whether a mode switch from a current torque distribution mode of the group of torque distribution modes to the most energy efficient torque distribution mode is allowed based on the current driving situation;
  - performing the mode switch from the current torque distribution mode to the most energy efficient torque distribution mode, in response to a result of the determining indicating that the mode switch is allowed; and
  - preventing the mode switch from the current torque distribution mode to the most energy efficient torque distribution mode, in response to the result of the determining indicating that the mode switch is not allowed.

20. The non-transitory computer-readable of claim 19, wherein the mode switch from the current torque distribution mode to the most energy efficient torque distribution mode is not allowed, if the evaluation of the actual driving situation with respect to the mode switch from the current torque distribution mode to the most energy efficient torque distribution mode does not comply with at least one of a safety requirement or a vehicle occupant comfort requirement.

* * * * *